(12) United States Patent
Henry, Jr.

(10) Patent No.: US 9,282,732 B2
(45) Date of Patent: Mar. 15, 2016

(54) FISHING ROD HOLDER

(71) Applicant: Herbert F. Henry, Jr., Rew, PA (US)

(72) Inventor: Herbert F. Henry, Jr., Rew, PA (US)

(\*) Notice: Subject to any disclaimer, the term of this patent is extended or adjusted under 35 U.S.C. 154(b) by 335 days.

(21) Appl. No.: 13/916,908

(22) Filed: Jun. 13, 2013

(65) Prior Publication Data
US 2013/0333268 A1  Dec. 19, 2013

Related U.S. Application Data

(60) Provisional application No. 61/757,772, filed on Jan. 29, 2013, provisional application No. 61/659,122, filed on Jun. 13, 2012.

(51) Int. Cl.
*A01K 97/10* (2006.01)

(52) U.S. Cl.
CPC ...................................... *A01K 97/10* (2013.01)

(58) Field of Classification Search
USPC .............................. 43/21.2; 248/519, 520, 529
See application file for complete search history.

(56) References Cited

U.S. PATENT DOCUMENTS

| | | | | |
|---|---|---|---|---|
| 3,186,666 A * | 6/1965 | Williams | ................ | A01K 97/10 248/519 |
| 4,763,435 A * | 8/1988 | Deering | ................ | A01K 97/10 43/21.2 |
| 4,964,233 A * | 10/1990 | Benson | ................ | A01K 97/12 43/17 |
| 5,533,295 A * | 7/1996 | Hochberger | ........... | A01K 97/10 248/512 |
| 5,560,137 A * | 10/1996 | Herring | ................ | A01K 97/10 248/514 |
| 6,125,571 A * | 10/2000 | Sigwald | ................ | A01K 97/125 43/16 |
| 6,817,136 B2 * | 11/2004 | Novak | ................ | A01K 97/10 43/19.2 |
| 6,898,892 B2 * | 5/2005 | Senckowski | ........... | A01K 97/01 43/16 |
| 7,765,732 B1 * | 8/2010 | Canevari | ................ | A01K 97/10 224/200 |
| 8,276,310 B1 * | 10/2012 | Weber | ................ | A01K 97/10 43/17 |
| 8,453,371 B1 * | 6/2013 | Sullivan | ................ | A01K 91/065 43/19.2 |
| 2009/0233736 A1 * | 9/2009 | Woods | ................ | A63B 69/0079 473/430 |

\* cited by examiner

*Primary Examiner* — Christopher P Ellis
(74) *Attorney, Agent, or Firm* — Del Vecchio and Stadler LLP

(57) ABSTRACT

An improved fishing rod holder is provided that includes a base assembly, a rod holder assembly, and a connecting member that connects the base and rod holder assemblies. The connecting member is connected to the rod holder assembly with a first T-joint. The rod holder assembly is configured to hold two fishing poles. The first T-joint is removable from the connecting member such that the connecting member and base assembly may be filled with water or sand to weigh down the fishing rod holder. In a second embodiment the rod holder assembly and the connecting member are the same, but the base assembly is replaced with a triangular-shaped base assembly. In third embodiment stabilization in enhanced, in a fourth embodiment fewer components are required, and in a fifth embodiment a canoe embodiment is presented.

8 Claims, 9 Drawing Sheets

FISHING ROD HOLDER

CROSS REFERENCE TO RELATED APPLICATIONS

This application claims the benefit of U.S. Provisional Application No. 61/757,772 filed on Jan. 29, 2013 and claims the benefit of U.S. Provisional Application No. 61/659,122 filed on Jun. 13, 2012 and the entire disclosures and contents of each are hereby incorporated herein by reference.

BACKGROUND

People who fish sometimes have a need to use their hands while fishing for purposes other than fishing. For example, a person fishing might need to make a phone call, take a break, steer his or her boat or eat. When this happens there is no place for the person fishing to place his or her fishing rod. As a result, the person fishing will either stop fishing altogether, or place the fishing rod on the ground and hope the fish take the bait and hook themselves. The person fishing might also place the fishing rod on the deck of the boat if he or she is fishing on a boat. However, the potential exists for a large fish taking the bait and pulling the rod overboard. Other fishermen have wedged the handle end of the pole between rocks.

There are also fishing rod holders in use that are shaped like a forked stick and made from wood, metals, aluminum or plastic. These devices are forced into the ground. A problem with these devices is that sometimes the ground is too hard to force it into the ground. In addition, these devices are susceptible to mud, dust and sand getting into the fishing equipment if they fall over when a minimal amount of force is applied to them. In addition, these devices are inadvertently forgotten and left behind when the person fishing goes home.

None of these are satisfactory solutions to the problem of freeing up the hands of a person who is fishing. Thus, it would be desirable to have an apparatus that allows a person to fish in a hands-free manner while at the same time ensuring that the fishing rod is stabilized and secured in a way that is very reliable.

SUMMARY

An improved fishing rod holder is provided that provides an angler with convenience, comfort, and a reliable way to catch fish in a hands-free manner. Indeed, the fishing rod holder allows the angler to fish in a relaxed manner while providing the angler with clear visibility of and accessibility to his or her fishing rod, for example if the angler is sitting next to the fishing rod holder. The improved fishing rod holder includes a base assembly, a rod holder assembly, and a connecting member that connects the base and rod holder assemblies. The base assembly has a four-way cross connector from which extends opposed first and second support members that are perpendicular to a third support member. A tube segment extends from the four-way cross connector to a male adapter that is threaded to a female adapter. The female adapter is joined to an extension member that is joined to a 90-degree joint that is joined with a 45-degree joint, and a connecting member is joined to the 45-degree joint. The connecting member extends to a first T-joint and supports the rod holder assembly. The rod holder assembly is configured to hold two fishing poles. The first T-joint is removable from the connecting member such that the connecting member and base assembly may be filled with water to weigh down the fishing rod holder for additional stability.

In a second embodiment the fishing rod holder assembly and the connecting member are the same, but the base assembly is replaced with an alternatively shaped base assembly.

In a third preferred embodiment an alternative a flared base assembly is provided for, and in a fourth preferred embodiment a fishing rod holder is provided having a reduced number of components.

In a fifth preferred embodiment a canoe fishing rod holder is provided for and can be used by people fishing from canoes.

The fishing rod holder can be placed on the ground or supported on the deck of a boat or in a canoe. The fishing rod holder allows the person fishing to freely use his or her hands to work on other tasks, and the fishing rod holder is heavy enough that it will not tip over when a fish is hooked or when used on a boat, even if the boat is trolling for fish. The boat for this fishing rod holder is for craft smaller than craft powered by an in-board motor that has already been equipped with some type of stationary rod holders. It is pointed out that that the fishing rod holder described herein is highly suited for use in connection with pontoon boats.

In addition, the fishing rod holder can be assembled and disassembled in a short amount of time by simply threading and unthreading the components from which it is made and by the use of clevis and key pin components.

BRIEF DESCRIPTION OF THE DRAWING FIGURES

DESCRIPTION

Figure 1:
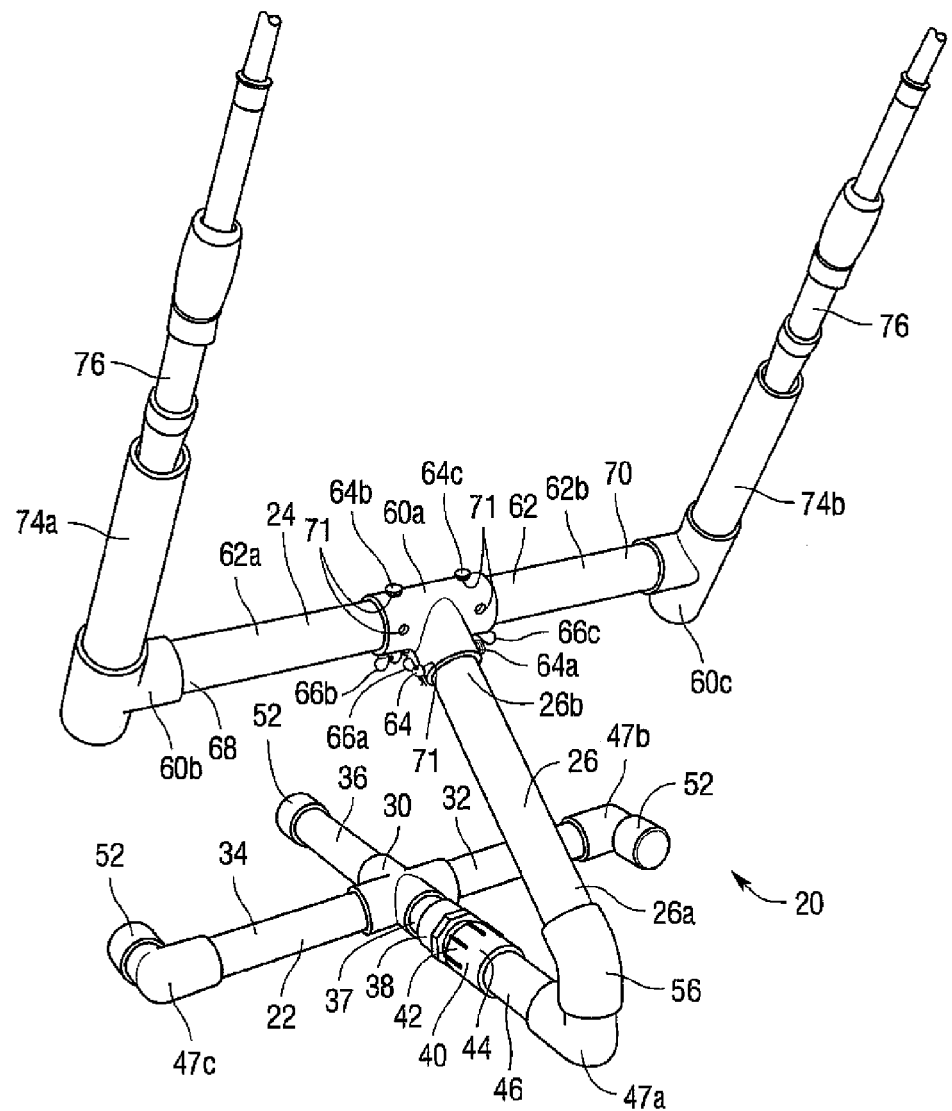
FIG. 1 is a perspective view of a fishing rod holder.
Figure 2:
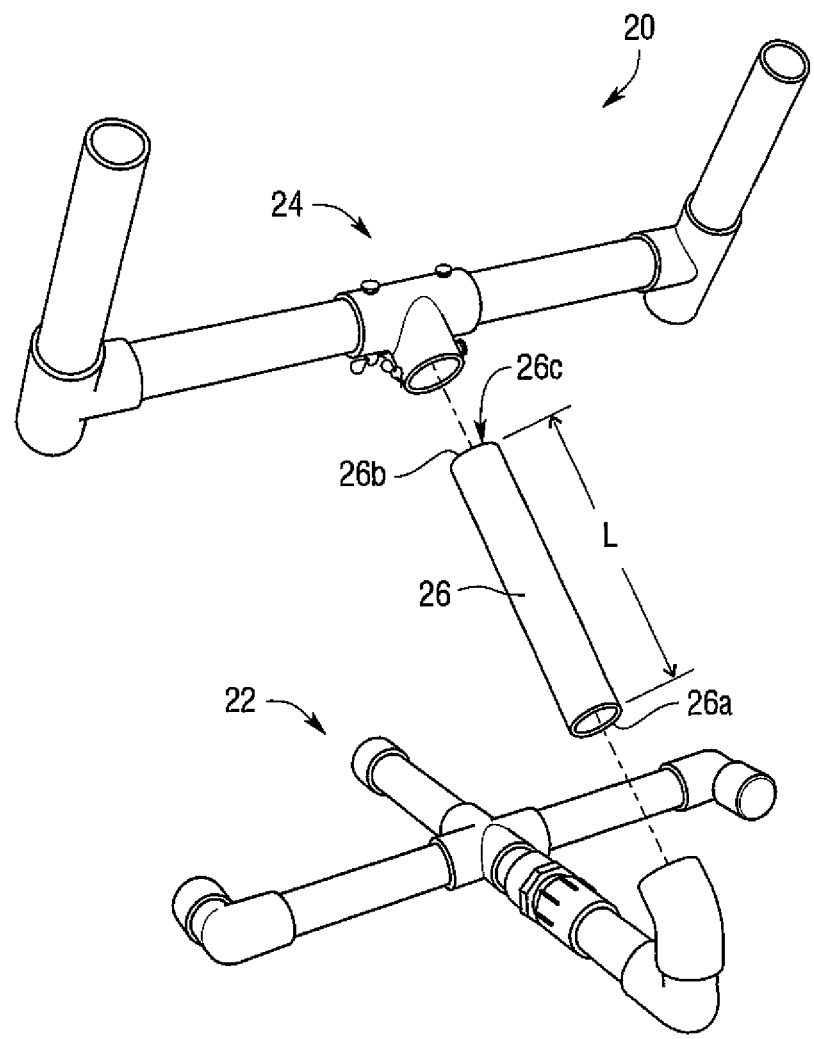
FIG. 2 is an exploded view of the fishing rod holder.
Figure 3:
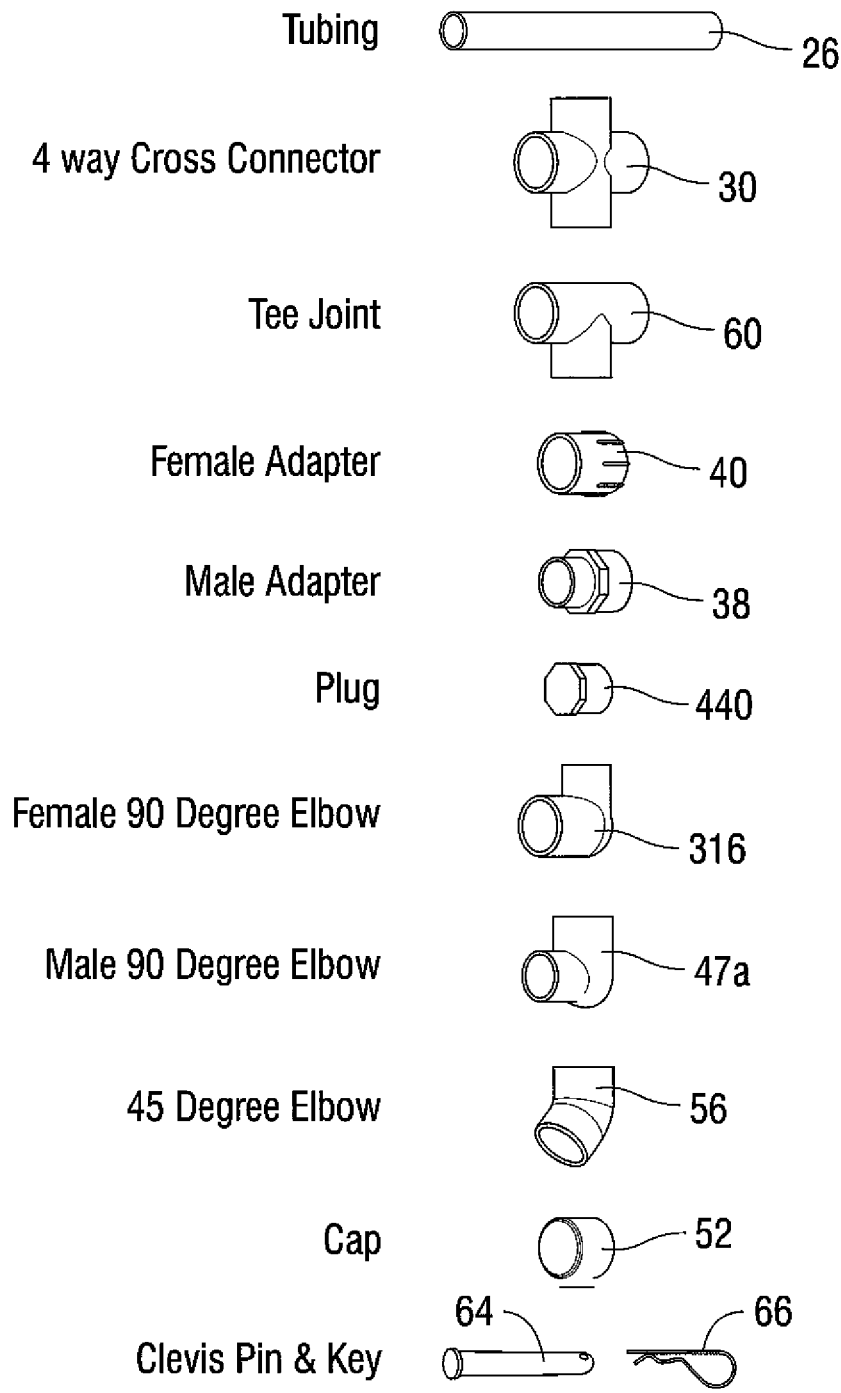
FIG. 3 is a parts legend for use in connection with the drawing figures.

As shown in FIGS. 1 and 2, a fishing rod holder 20 that is improved is provided comprising a base assembly 22, a rod holder assembly 24, and a connecting member 26 that connects the base and rod holder assemblies 22, 24. The connecting member has a length designate L in FIG. 2 that is about fourteen inches in one of the preferred embodiments, but may be more or less than fourteen inches in other preferred embodiments. A parts reference list is provided for in FIG. 3.

The base assembly 22 has a four-way cross connector 30 from which extend opposed first and second support members 32, 34 that are perpendicular to a third support member 36 and tube segment 37 that is joined to a male adapter 38. The first, second and third support members 32, 34, 36, the tube segment 37, and the male adapter 38 comprise polyvinyl chloride (PVC) pipe or tubing or material in one of the preferred embodiments. The base assembly 22 further includes a female adapter 40 having a first end 42 that is threaded or interconnected or otherwise coupled to the male adapter 38, and has a second end 44 that is treaded to one end to an extension member 46 or otherwise joined thereto (for example, with pipe cement). The other end of the extension member 46 is threaded to one end of a 90-degree joint 47a (or joined thereto with pipe cement). It is pointed out that the ends of each of the first and second support members 32, 34 are threaded to 90-degree joints 47b, 47c, respectively, (or joined with pipe cement) and are closed with caps commonly designated 52, and the third support member 36 is closed with a cap 52. The caps 52 are threadably connected to the 90-degree joints 47b, 47c and the third support member 36. The 90-degree joints 47b, 47c face in opposite directions as shown in one of the preferred embodiments. The fishing rod holder 20 can be filled with a fluids or solids (sand, gravel) such that the base assembly 22 is weighted down. One of the caps 52 may be unscrewed to fill and empty the base assembly 22. It is pointed out that joining PVC tubing and piping, adapters and joints can be accomplished with external and internal threading or pipe cement or glue all of which is well known to those having ordinary skill in the art.

A 45-degree joint 56 is threaded to the other end of the 90-degree joint 47a. A first end 26a of the connecting member 26 is threaded to the other end of the 45-degree joint 56 and plastic pipe cement may be used on the 45-degree joint 56. A first T-joint 60a is loosely fitted over a second end 26b (best shown in FIG. 2) of the connecting member 26 such that the connecting member 26 is perpendicular to the first T-joint 60a in one of the preferred embodiments. For this to be possible, an outer diameter of the second end 26b of the connecting member 26 is less than an inner diameter of the first T-joint 60a. A first clevis pin 64a and first key 66a are used to secure the connecting member 26 and the first T-joint 60a. In particular, the first clevis pin 64a extends through openings (commonly designated 71) defined in the first T-joint 60a and the connecting member 26, and the first clevis pin 64a is held in place with the first key 66a. The use of the first clevis pin 64a and the first key 66a allows for the rapid assembly and disassembly of the fishing rod holder 20, such that it can be readily be disassembled for storage. In addition, the second end 26b of the connecting member 26 can be used to fill and empty the base assembly 22. The connecting member 26 is in the form of polyvinyl chloride (PVC) pipe or tubing in one of the preferred embodiments. It is pointed out that the second end 26b of the connecting member 26 defines a flow opening 26c (best shown in FIG. 2) when the first T-joint 60a is removed such that fluids and solids (sand) can be introduced into the base assembly 22 via the connecting member 26.

Figure 1A:
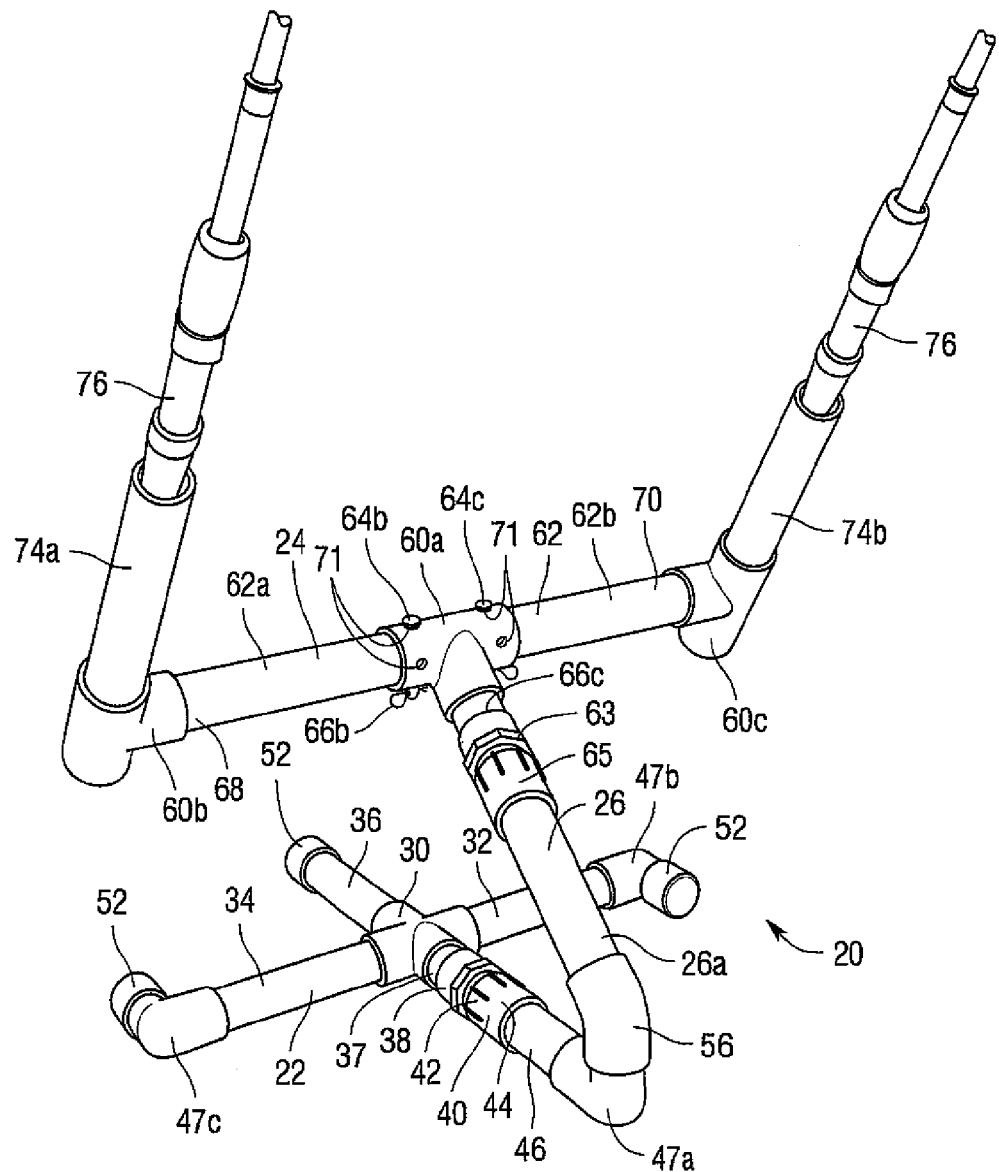
FIG. 1A is a perspective view of an alternative embodiment of the fishing rod holder.

In another preferred embodiment shown in FIG. 1A, the first clevis pin 64a and the first key 66a are not present. In particular a T-joint splice member 61 extends from the first T-joint 64 to a first T-joint male adapter 63 that, in turn, extends and couples with or threads to a first T-joint female adapter 65. The first T-joint female adapter 65 in turn is joined to the connecting member 26. The first T-joint male adapter 63 and the first T-joint female adapter 65 can be quickly connected and disconnected for assembly and disassembly purposes.

As shown in FIG. 1 the rod holder assembly 24 includes a pair of opposed first and second fishing rod support arms 62a, 62b that are supported by the first T-joint 60a. The first and second fishing rod support arms 62a, 62b are in the form of polyvinyl chloride (PVC) pipe or tubing in one of the preferred embodiments. A second clevis pin 64b extends through the first T-joint 60 and the first fishing rod support arm 62a and is secured in place with a second key 66b, and a third clevis pin 64c extends through the first T-joint 60a and the second fishing rod support arm 62b and is secured in place with a third key 66c. The first T-joint 60a and first and second fishing rod support arms 62a, 62b defined openings 71 to allow the second and this clevis pins 64b, 64c to pass therethrough. This allows the user to adjust the rod holder assembly 24 by removing the second and third clevis pins 64b, 64c, as more fully described below.

A second T-joint 60b is joined to a first support arm end 68 of the first fishing rod support arm 62a, and a third T-joint 60c is joined to a second support arm end 70 of the second fishing rod support arm 62b. A first rod holder 74a is threaded to the second T-joint 60b, and a second rod holder 74b is threaded to the second T-joint 60c. Fishing poles 76 can be placed in the first and second rod holders 74a, 74b. In particular, the first T-joint 60a and the first fishing rod support arm 62a and the second fishing rod support arm 62b can each define a plurality of openings, commonly designated 71, for receiving the second and third second clevis pins 64b, 64c, respectively. The user can adjust the angle of each of the fishing poles 76 by installing the second and third clevis pins 64b, 64c in the desired openings 71 and the securing them in place with the second and third keys 66b, 66c, respectively. The user would be rotating the first and second fishing rod support arms 62a, 62b and securing them in place with the second and third clevis pins 64b, 64c. It is pointed out that in another preferred embodiment the second T-joint 60b and the third T-joint 60c are replaced with 90-degree joints.

The above-described base assembly 22 can be filled with water, sand or other material to weigh the base assembly 22 down, thus preventing the fishing rod holder 20 from tipping over. One way to accomplish this is to remove the first clevis pin 64a and first key 66a and pours fluid (water) or a solid (sand or gravel) through the flow opening 26c and down the connecting member 26 such that the fluid/material flows into the base assembly 22. The user can remove the end caps 52, thus allow for the speedy draining of the water/sand from the base assembly 22. It is pointed out that the first clevis pin 64a and first key 66a allow for the easy and quick assembly and disassembly of the fishing rod holder 20. In addition, the male adapter 38 and female adapter 40 can be manually coupled and de-couple from one another in one of the preferred embodiments to further facilitate the assembly and disassembly process.

FIG. 2 is an exploded view of FIG. 1 of the fishing rod holder 20 showing the base assembly 22 separate from the connecting member 26 and rod holder assembly 24. It is pointed out that all the dimensions shown of the fishing rod holder 20 can be varied to provide a fishing rod holder that is suitable for virtually any desired application.

Figure 4:
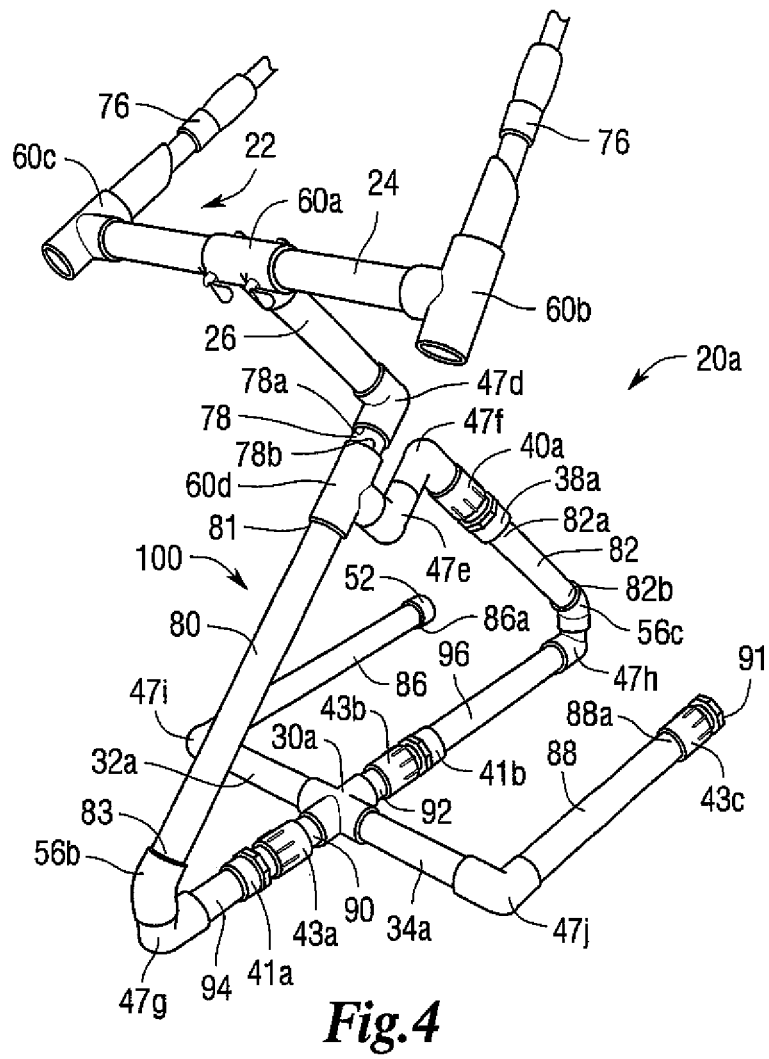
FIG. 4 is a perspective view of a second embodiment of the fishing rod holder.
Figure 4A:
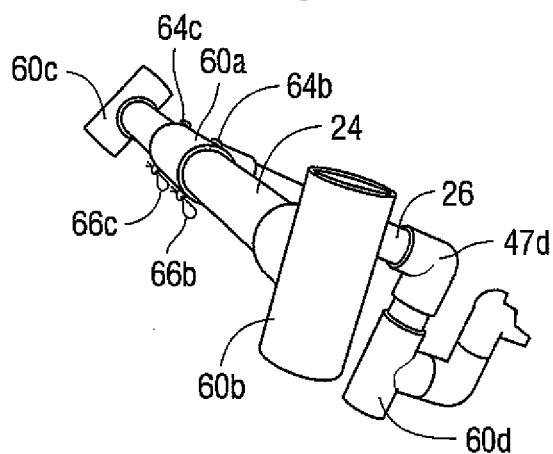
FIG. 4A is a perspective view depicting a portion of the second embodiment and depicts clevis pin and key components.
Figure 5:
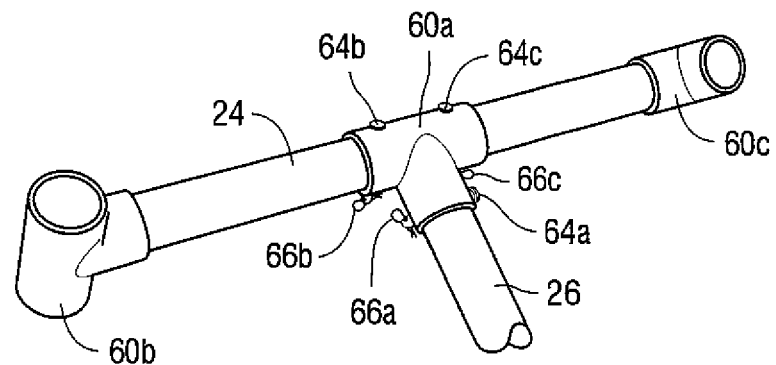
FIG. 5 is a perspective view of a portion of the second embodiment.
Figure 6:
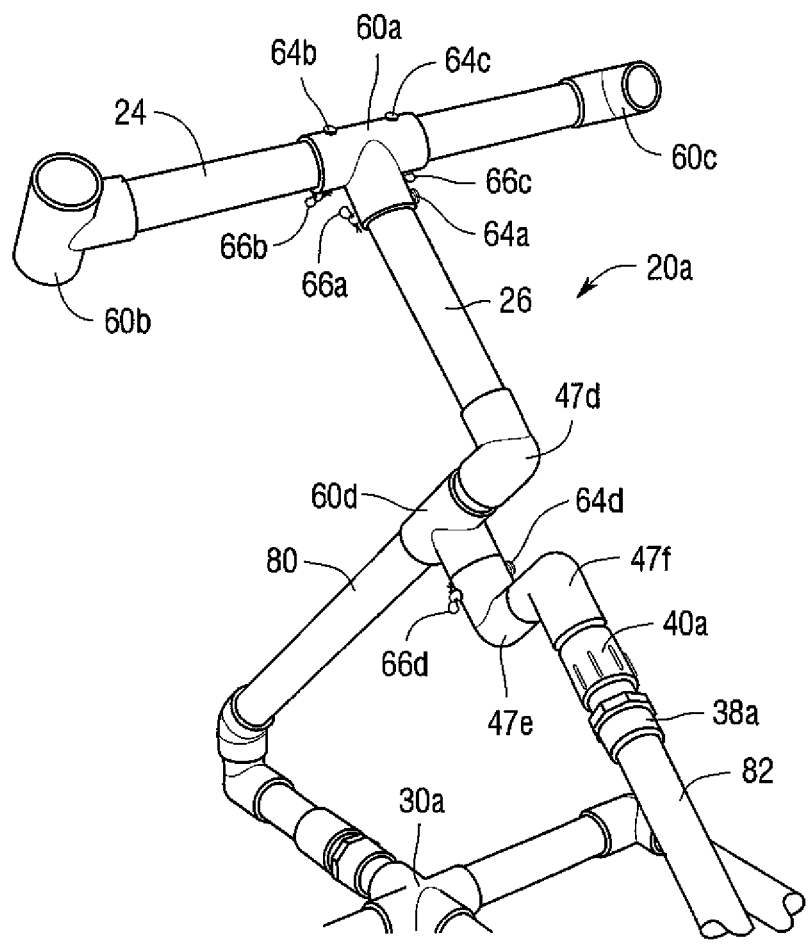
FIG. 6 is a perspective view of another portion of the second embodiment.

FIGS. 4-6 depict a second embodiment of a fishing rod holder 20a. As shown, the rod holder assembly 24 and the connecting member 26 are the same as described above in connection with the first embodiment and therefore are not described in greater detail herein.

As shown, the above-described base assembly 22 is replaced with a shaped base assembly 100. The shaped base assembly 100 includes a first supporting 90-degree joint 47d, one end of which is joined to the connecting member 26 and the other end of which is joined to a first segment member end 78a of a segment member 78, and a second segment member end 78b of the segment member 78 extends and is joined to a first supporting T-joint 60d. In one of the preferred embodiments the segment member 78 and first supporting T-joint 60d are threaded or cemented together or may be held together with a clevis pin and key. A first brace member 80 is provided having opposed first and second brace member ends 81, 83. The first brace member end 81 is threaded to the first supporting T-joint 60d such that the first brace member 80 and segment member 78 are opposed. As an option, the second supporting 90-degree joint 47e is joined to the first supporting T-joint 60 with a fourth clevis pin 64d and fourth key 66d as shown in FIG. 6. The second supporting 90 degree joint 47e is also joined to a third supporting 90 degree joint 47f, that in turn is joined to a first female adapter 40a, that in turn is joined (threaded) to a first male adapter 38a.

A second brace member 82 is provided have opposed first and second brace member ends 82a, 82b. The first male adapter 38a is joined to the first brace member end 82a such that the first and second brace members 80, 82 are disposed at an acute angle relative to one another. The first male and female adapters 38a, 40a can be readily coupled and de-coupled for assembly and disassembly purposes.

Returning to the first brace member 80, the first brace member end 83 is joined to a first base 45-five degree joint 56b, that in turn is joined to a first base 90-degree joint 47g, that in turn is joined to a first load support adapter member 94, that in turn is joined to a first base male adapter 41a that is threaded to a first base female adapter 43a. A first base splice segment 90 extends from the first female base adapter 43a and extends to and is joined with to a four-way base cross connector 30a. Joined to and extending opposite directions from the four-way base cross connector 30a are first and second base support members 32a, 34a. Base 90-degree joints 47i, 47j are threaded to the first and second base support members 32a, 34a, respectively. First are second stabilizing members 86, 88 are threaded to the base 90 degree joints 47i, 47j, respectively, and a cap 52 is threaded to an end 86a of the first stabilizing member 86. An end 88a of the second stabilizing member 88 is threaded or otherwise joined to a third base female adapter 43c and closed with a removable plug 91. The removable plug 91 is treaded to the third female base adapter 43c and allows for fluids and solids to be emptied from the fishing rod holder 20a.

The second brace member 82 is threaded or joined to a second base 45-degree joint 56c, that in turn is threaded or joined to a second base 90-degree joint 47h, that in turn is joined to a second load support adapter member 96, that in turn is joined to a second base male adapter 41b that is threaded or otherwise joined to a second base female adapter 43b. A second base splice segment 92 extends from the second base female base adapter 43b and extends to and is joined to the four-way base cross connector 30a.

To load the fishing rod holder 20a with water or sand, the same process as described above is used to assemble and disassembly the rod holder assembly 24 and other components as described above.

Figure 7:
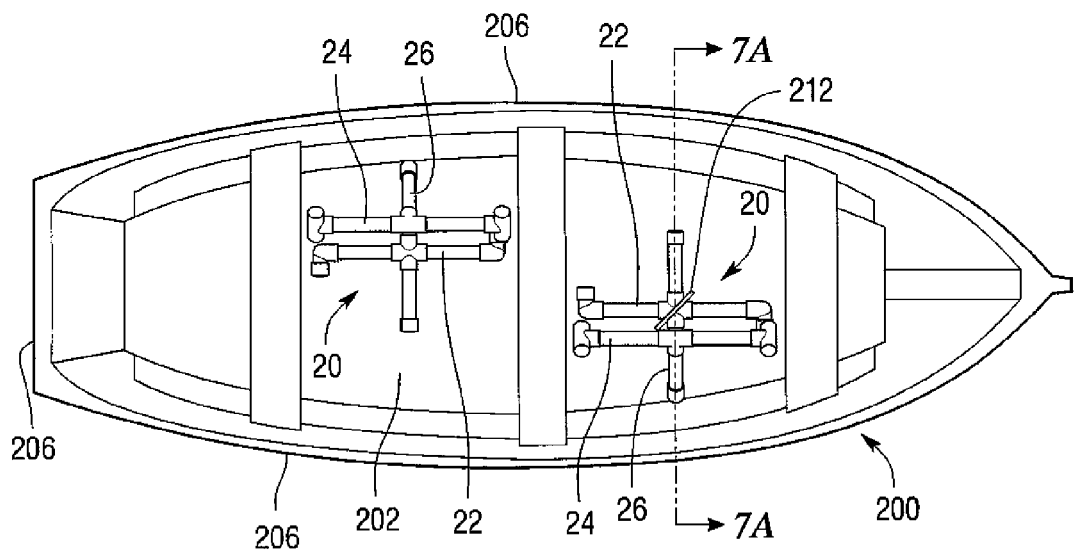
FIG. 7 is a top plan view of the second embodiment of the fishing rod holder supported on a deck of a boat.
Figure 7A:
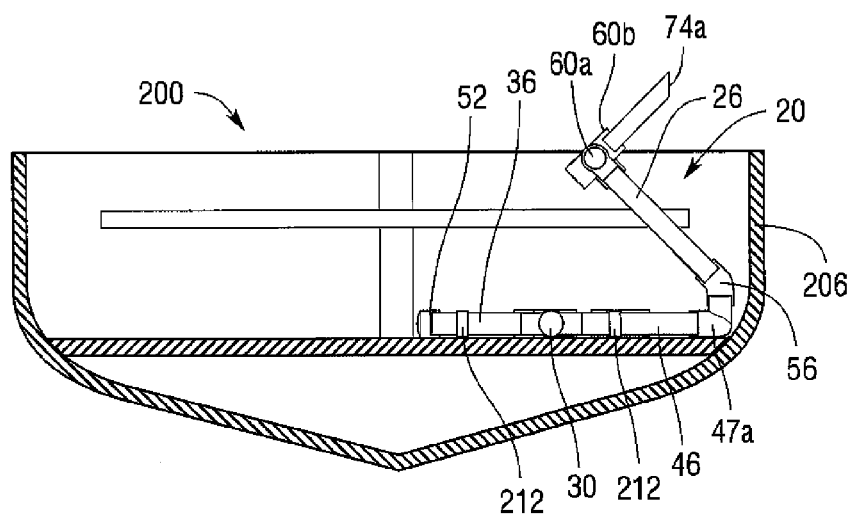
FIG. 7a is a sectional view of the boat taken along line 7A-7A of FIG. 7.

FIG. 7 is a top view of the fishing rod holder 20 supported on the deck 202 of a boat 200. Extending from the deck 202 are boat side walls 206. FIG. 7A is a sectional view of the boat taken along line 7A-7A of FIG. 7. As shown, in one of the preferred embodiments the fishing rod holder 20 is supported on the deck 202 such that the fishing rod holder 20 is recessed relative to the boat side walls 206. In such an embodiment the length of the connecting member 26 may be less as compared to the length L of the connecting member 26 shown in FIG. 4, so that the fishing rod holder 20 is recessed relative to the surrounding boat side walls 206.

As described above, the fishing rod holder 20, 20a can be assembled and disassembled in a short amount of time by quickly threading and unthreading the above-described threaded adapters and by removing or installing the key pins from the clevis pins.

One way to stabilize the fishing rod holder 20 on the deck of the boat would be to fill the fishing rod holder 24 with sand or water as previously described. In an alternative embodiment, straps 212 may be used to secure the fishing rod holder 24 to the deck 202 of the boat 200 thus eliminating the need to fill the fishing rod holder 24 with sand or water.

Figure 8:
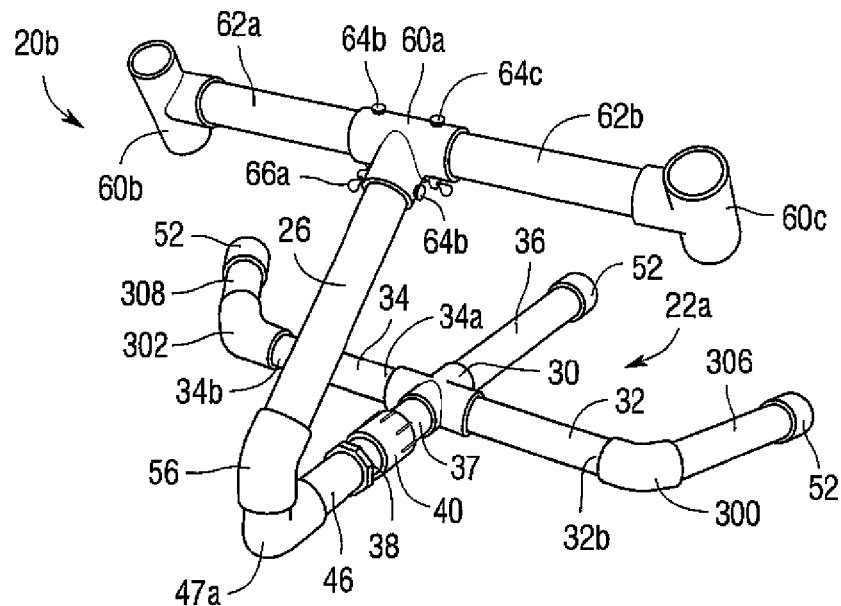
FIG. 8 is a perspective view of a third embodiment of the fishing rod holder.

Shown in FIG. 8 is another embodiment of the fishing rod holder 20b that includes the previously described a rod holder assembly 24 and a connecting member 26 of the first embodiment described herein, and is therefore not described herein again. In this embodiment the previously described base assembly 22 of FIG. 1 is replaced or modified with a flared base assembly 22a. In particular, the connecting member 26 is joined to the 45-degree joint 56 that is threaded to the 90-degree joint 47a. An extension member 46 extends from the 90-degree joint 47a to a male adapter 38 that is joined to a female adapter 40, and the tube segment 37 is joined to the female adapter 40 and the four-way cross connector 30. The first support member 32 with opposed first and second ends 32a, 32b is provided, and the second support member 34 having first and second ends 34a, 34b is provided, and the first ends of the first and second support members 32a and 34a are threaded to the four-way cross support member 30. A first flaring 45-degree joint 300 is joined to the second end 32b of the first support member 32, and a second flaring 45-degree joint 302 is joined to the second end 34b of the second support member 34. A first stabilizer tube 306 is joined to the first flaring 45-degree joint 300 and closed with an end cap 52, and a second stabilizer tube 308 is joined to the second flaring 45-degree joint 302 and closed with an end cap 52. The first and second stabilizer tubes 306, 308 provide for enhanced stability while fishing.

Figure 9:
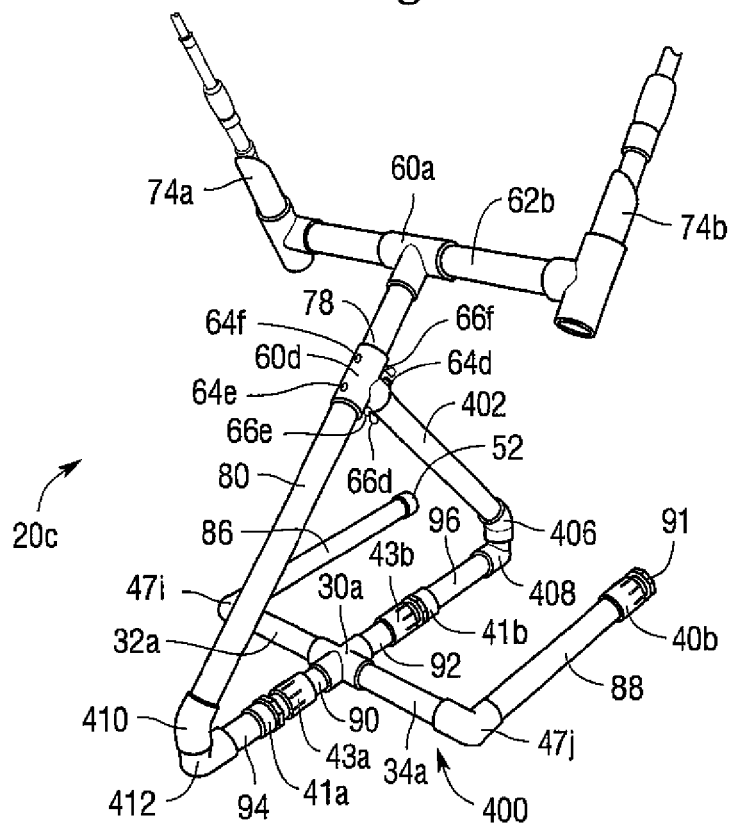
FIG. 9 is a perspective view of a fourth embodiment of the fishing rod holder.

FIG. 9 shows a fourth embodiment of a fishing rod holder 20c that includes the previously described a rod holder assembly 24 of the first embodiment described herein, and is therefore not described herein again. As shown, the above-described shaped base assembly 100 is replaced with a triangular-shaped base assembly 400. The triangular shaped base assembly 400 is similar to the shaped base assembly with the differences being described below. Beginning with the previously described segment member 78 that extends from the first T-joint 60a to the first supporting T-joint 60d, the first supporting T-joint 60d is joined to a first load bearing member 402 that extends to a first load bearing 90-degree joint 406 that is joined to a first load bearing 45-degree joint 408. The first load bearing 45-degree joint 408 is connected to the previously described second load support adapter member 96. In addition, the first brace member 80 extends from the first supporting T-joint 47d to a second load bearing 90-degree joint 410 that is joined to a second load bearing 45-degree joint 412. The second load bearing 45-degree joint is joined to the previously described a first load support adapter member 94. The remainder of the structure of this embodiment is the same as previously described in connection with FIGS. 4-6. In addition, first, second and third support clevis pins 64d, 64e, 64f and first, second and third support clevis pin keys 66d, 66e and 66f can be used to secure the first supporting T-joint 60d to the segment member 78, the first brace member 80 and the first load bearing member 402 in the same manner as previously described.

The fourth embodiment of the fishing rod holder 20c can be rapidly assembled and disassembled because of the use of the threaded connections, and advantageously requires a minimal amount of room for storage when it is disassembled.

Figure 10:
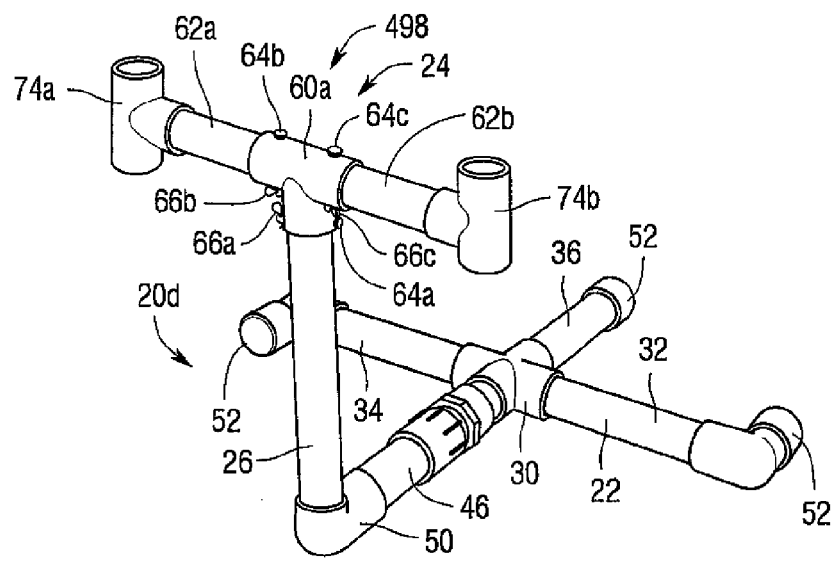
FIG. 10 is a perspective view of a fifth embodiment of a canoe fishing rod holder.
Figure 11:
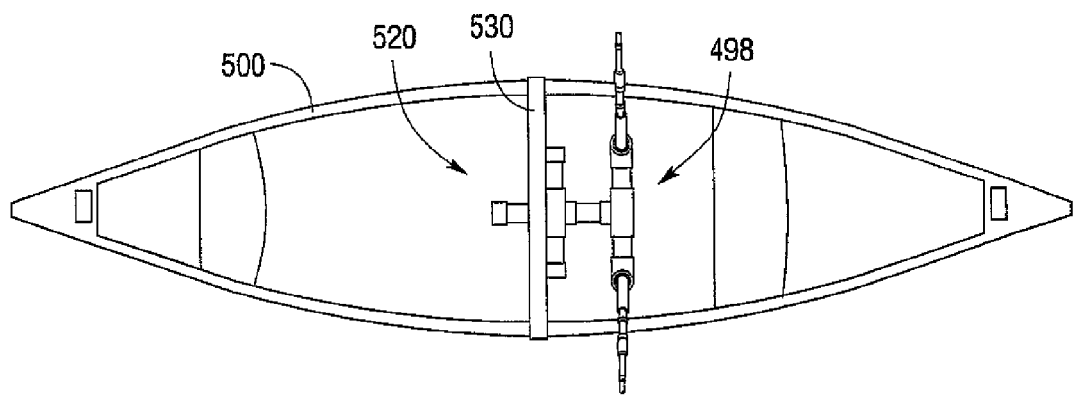
FIG. 11 is a plan view of the fifth embodiment of the canoe fishing rod holder disposed in a canoe.

FIGS. 10-11 show a fifth embodiment of depicting a canoe fishing rod holder 498 that is suitable for use in a canoe 500. As shown, there is the previously described rod holder assembly 24 with first fishing and second fishing rod support arm 62a, 62b, connecting member 26 and first T-joint 60a with the clevis pins 64a, 64b, 64c and keys 66a, 66b and 66c. The connecting member 26 is joined to a supporting 90-degree joint 501 that is joined to the previously described base assembly 22 shown in FIG. 1. The person in the canoe 500 can use the canoe fishing rod holder 498 for still fishing or trolling.

Figure 10A:
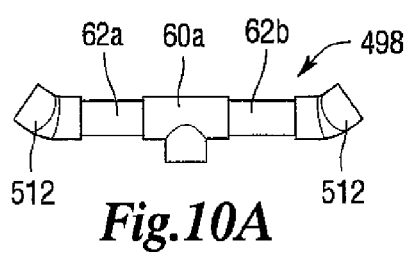
FIG. 10A is view of a portion of the canoe fishing rod holder having a modified fishing rod holder assembly.
Figure 10B:
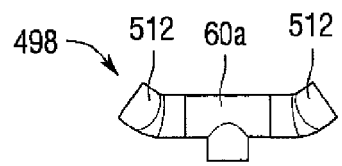
FIG. 10B is a view of a portion of the canoe fishing rod holder having another modified fishing rod holder assembly.

As shown in FIG. 10A, in another preferred embodiment that depicts a portion of the canoe fishing rod holder 498, the rod holder assembly 24 is made such that the first and second first fishing rod support arms 62a, 62b are joined to first and second canoe 45-degree joints 510, 512 (that replace the second and third T-joints 60b, 60c). As shown in FIG. 10B, in another preferred embodiment that depicts a portion of the canoe fishing rod holder 498, the first and second first fishing rod support arms 62a, 62b are not present, and the first canoe 45-degree joint 510 is joined to the first T-joint 60a, and the second canoe 45-degree joint 512 is joined to the first T-joint 60a.

In other preferred embodiments, the PVC pipe is made from clear PCV material, and all the PCV pipe, and the joints and threaded adapters are made of 1.25 inch diameter PVC pipe and adapters.

It is pointed out that in other preferred embodiments the fishing rod holder rod holders 20, 20a, 20b, 20c and the canoe fishing rod holder 498 may comprise solid components or may all be formed of PVC material and tubes and/or pipes, and may be formed as a single one piece unit made of plastic. The fishing rod holder 20 is weather resistant, durable, stable and easy to assemble and disassemble. In addition, the joining and connecting of the components described herein can be accomplished with cements, glues, internally and externally threaded components, clevis pin and key, and friction fits.

In addition, the fishing rod holders are easy to assemble and disassemble, they keep fishing rods and equipment off the ground and they provide for constant fishing, because if one rod has a fish hooked or the line thereof breaks, the other rod is still being used. In addition, they avoid problems with tangles, for example with youth fishing. The user can also attach his or stringer or minnow bucket to the base. Also, the fishing rod holder assemblies can be interchanged with one another, and water and sand can be added to the base for increasing stability.

It will be appreciated by those skilled in the art that while the fishing rod holders 20, 20a, 20b, 20c and the canoe fishing rod holder 498 have been described in detail herein, the invention is not necessarily so limited and other examples, embodiments, uses, modifications, and departures from the embodiments, examples, uses, and modifications may be made without departing therefrom and all such embodiments are intended to be within the scope and spirit of the appended claims.

What is claimed:
1. A fishing rod holder comprising:
a base assembly;
a connecting member having opposed first and second ends that is supported by the base assembly;
a rod holder assembly supported on the second end of the connecting member and the first end of the connecting member supported by the base assembly;
wherein base assembly further includes a four-way cross connector from which extend opposed first and second support members, and from which extend a third support member and a tube segment and the tube segment is joined to a male adapter and wherein the first and second support members are perpendicular to the third support member and the male adapter; and,
a female adapter coupled to the male adapter and joined to an extension member, and the extension member is joined to a 90-degree joint, and a 45-degree joint is joined the 90-degree joint, and wherein the first end of the connecting member is joined to the 45 degree joint such that the connecting member is at 45-degree angle relative to the base assembly.

2. The fishing rod holder according to claim 1 wherein a first T-joint is fitted on the second end of the connecting member such that the connecting member is perpendicular to the first T-joint and a first clevis pin extends through the first T-joint and the first clevis pin held in place with a first key.

3. The fishing rod holder according to claim 2 wherein the rod holder assembly includes first and second fishing rod support arms and each of the first and second fishing rod support arms is supported by the first T-joint such that the first and second support arms are each perpendicular to the connecting member and a second clevis pin extends through the first T-joint and the first fishing rod support arm and a third clevis pin extends though the first T-joint and the second first fishing rod support arm.

4. The fishing rod holder according to claim 3 wherein the connecting member, the first T-joint and the first and second fishing rod support arms define openings sized to receive the second and third clevis pins such that the such that the first and second fishing rod support arms can be rotated relative to the connecting member and held in place by the second and third clevis pins.

5. The fishing rod holder according to claim 3 wherein the first fishing rod support arm has a first support arm end and the second fishing rod support arm has a second support arm end and a second T-joint is joined to the first support arm end and a third T-joint is joined to the second support arm end, and a first rod holder is supported in the second T-joint and a second rod holder is supported in the third T-joint.

6. The fishing rod holder according to claim 1 wherein the first, second and third support members are closed with caps and the second end of the connecting member defines a flow opening and wherein the flow opening for allowing the flow of fluids or solid to the base assembly such that the base assembly is capable of being weighted down.

7. A fishing rod holder comprising:
a base assembly;
a connecting member having opposed first and second ends that is supported by the base assembly,
a rod holder assembly supported on the second end of the connecting member and the first end of the connecting member supported by the base assembly, and,
a first T-joint is fitted on the second end of the connecting member to support the rod holder assembly such that the connecting member is perpendicular to the first T-joint and a first clevis pin extends through the first T-joint and the first clevis pin held in place with a first key.

8. A fishing rod holder comprising;
a base assembly;

a connecting member having opposed first and second ends that is supported by the base assembly;
a rod holder assembly supported on the second end of the connecting member and the first end of the connecting member supported by the base assembly;
the base assembly further includes a four-way cross connector from which extend opposed first and second support members, and from which extend a third support member and a tube segment and the tube segment is joined to a male adapter and wherein the first and second support members are perpendicular to the third support member and the male adapter; and,
wherein the first support member extends to and is joined with a 45-degree joint and a first stabilizer tube extends from the 45-degree joint, and the second support member extends to another 45-degree joint and a second stabilizer tube extends from the another 45-degree joint and the first and second stabilizer tubes are for providing and stability.

\* \* \* \* \*